US011025536B1

(12) United States Patent
Venkataramanan et al.

(10) Patent No.: US 11,025,536 B1
(45) Date of Patent: Jun. 1, 2021

(54) SUPPORT FOR FLOODING IN ENCAPSULATION AND INTER-VLAN COMMUNICATION VIA PROXY-ARP

(71) Applicant: Cisco Technology, Inc., San Jose, CA (US)

(72) Inventors: Gautam Venkataramanan, Dublin, CA (US); Umamaheswararao Karyampudi, Fremont, CA (US); Eddie Tan, Saratoga, CA (US); Ajay Modi, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 193 days.

(21) Appl. No.: 16/040,291

(22) Filed: Jul. 19, 2018

(51) Int. Cl.
| | |
|---|---|
| *H04L 12/721* | (2013.01) |
| *H04L 12/46* | (2006.01) |
| *H04L 12/741* | (2013.01) |
| *H04L 12/24* | (2006.01) |
| *H04L 29/12* | (2006.01) |

(52) U.S. Cl.
CPC .......... *H04L 45/32* (2013.01); *H04L 12/4633* (2013.01); *H04L 12/4641* (2013.01); *H04L 41/0893* (2013.01); *H04L 45/74* (2013.01); *H04L 61/103* (2013.01)

(58) Field of Classification Search
CPC . H04L 45/32; H04L 12/4633; H04L 12/4641; H04L 41/0893; H04L 61/103
See application file for complete search history.

(56) References Cited

U.S. PATENT DOCUMENTS

| | | | | |
|---|---|---|---|---|
| 7,046,663 | B1* | 5/2006 | Temoshenko | H04L 12/2854 370/390 |
| 7,849,506 | B1* | 12/2010 | Dansey | H04L 63/1416 713/188 |
| 2011/0280248 | A1* | 11/2011 | Singh | H04L 12/4625 370/401 |
| 2013/0039218 | A1* | 2/2013 | Narasimhan | H04L 49/356 370/255 |
| 2015/0172156 | A1* | 6/2015 | Lohiya | H04L 61/103 709/224 |
| 2016/0241515 | A1* | 8/2016 | Pai | H04W 48/08 |
| 2019/0018716 | A1* | 1/2019 | Guo | G06F 9/542 |
| 2019/0222431 | A1* | 7/2019 | Gao | H04L 12/1877 |

* cited by examiner

*Primary Examiner* — Kevin C. Harper
(74) *Attorney, Agent, or Firm* — Merchant & Gould P.C.

(57) ABSTRACT

A first leaf switch may receive from a first host, a request for a second host that is not known at the first leaf switch. The first host may be within a first End Point Group (EPG) and the second host being within a second EPG. The first EPG and the second EPG may be in a Bridge Domain (BD). Flood in encapsulation may be enabled for the first EPG and for the second EPG. Next, the first leaf switch may flood the request locally in the first EPG and to a spine switch with a VNID of the first EPG. The spine switch may then flood the request to a second leaf switch where the BD is present. The second leaf switch may send a glean request for the second host, receive, in response to sending the glean request, a reply, and learn the second host locally in response to receiving the reply.

20 Claims, 5 Drawing Sheets

SUPPORT FOR FLOODING IN ENCAPSULATION AND INTER-VLAN COMMUNICATION VIA PROXY-ARP

TECHNICAL FIELD

The present disclosure relates generally to inter-VLAN communication.

BACKGROUND

Software-defined networking (SDN) is an approach to cloud computing that facilitates network management and enables programmatically efficient network configuration in order to improve network performance and monitoring. SDN is meant to address the issue that the static architecture of traditional networks is decentralized and complex while current networks require more flexibility and troubleshooting. SDN centralizes network intelligence in one network component by disassociating the forwarding process of network packets (i.e., the data plane) from the routing process (i.e., the control plane). The control plane comprises one or more controllers that are considered to be the brain of an SDN network where the intelligence is incorporated.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
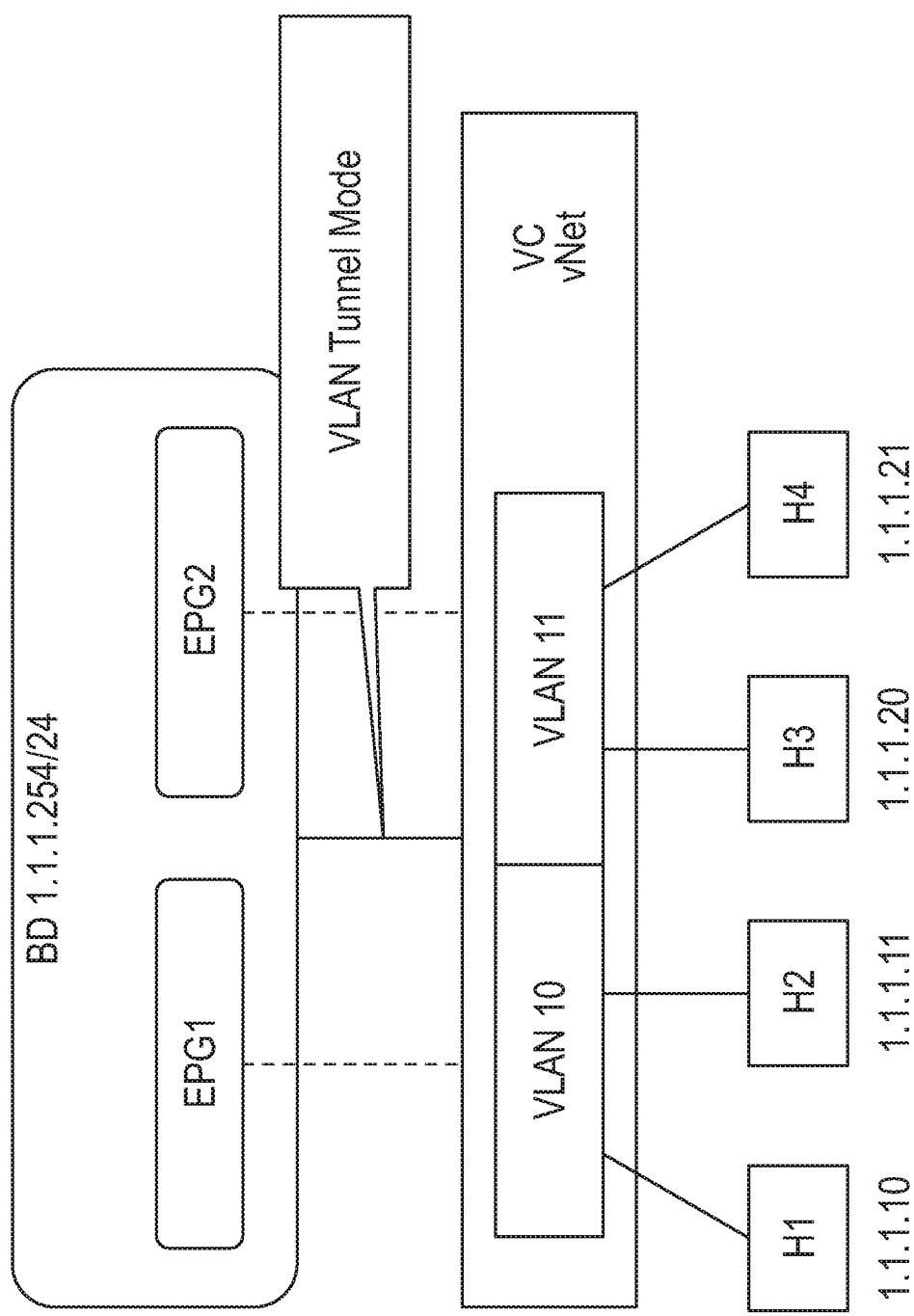
FIG. 1 shows a software-defined network (SDN)

Support for flooding in encapsulation may be provided. First, a first leaf switch may receive from a first host, a request for a second host that is not known at the first leaf switch. The first host may be within a first End Point Group (EPG) and the second host being within a second EPG. The first EPG and the second EPG may be in a Bridge Domain (BD). Flood in encapsulation may be enabled for the first EPG and for the second EPG. Next, the first leaf switch may flood the request locally in the first EPG and to a spine switch with a Virtual Extensible Local Area Network (VXLAN) Network Identifier (VNID) of the first EPG. The spine switch may then flood the request to a second leaf switch where the BD is present. The second leaf switch may send a glean request for the second host, receive, in response to sending the glean request, a reply, and learn the second host locally in response to receiving the reply.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

SDN may include application centric networking that may enable application agility and data center automation. Data center users may be moving towards application centric networking that may include a single Bridge Domain (BD), multiple End Point Groups (EPGs) within a single subnet, and with all the Virtual Machines (VMs) of the user being part of the same subnet. This design of having multiple EPGs under the same BD may have the advantage of allowing End Points (EPs) to be assigned to different policy groups/EPGs without changing the Internet Protocol (IP) address. All EPs under a BD may use the same set of subnets. Changing IP for an EP may have a negative impact to applications and other parts of the network. Therefore, users may desire the design of multiple EPGs under a BD so that they can move workloads to EPGs based on policy needs. However, users have hesitated to deploy such a design due to the issue that broadcast, unknown unicast, and multicast (BUM) traffic may be flooded within the same BD leading to potential instability and security risks.

Also, in these scenarios, there may be multiple EPGs under a BD where some of the EPGs may be service nodes comprising, for example, load balancers or firewalls. In this situation, users having downlink switches may need northbound devices to perform Flooding in Encapsulation (FIE) for intra-Virtual Local Area Network (VLAN) traffic. This may be to avoid Media Access Control (MAC) flaps of host Virtual Machines (VMs) on these downlink switches that do VLAN agnostic MAC learning.

FIG. 1 shows a software-defined network (SDN) 100. As shown in FIG. 1 for example, a Virtual Connect (VC) tunnel mode may maintain one MAC address per vNet. VC may not include a VLAN ID in a MAC address table. If multicast or broadcast or unknown unicast packets are sent from H1 towards H3, then H1 may be learnt initially on a southbound link of VC. Since the packet may be flooded within all EPGs of the BD, H1 may now be learnt on the northbound port of VC agnostic of the incoming VLAN. This may break MAC learning and the forwarding model of the VC tunnel mode.

Also there could be inter-VLAN or inter-EPG traffic that should not be flooded within the originating encapsulation. These packets may have a conflicting requirement to resolve Address Resolution Protocol (ARP) requests. For example, the packets may have to be flooded within the incoming EPG if the target endpoint is within the same EPG as the originating EPG. However, if the target IP is behind the destination EPG, then these ARP packets may not be flooded to that EPG. Accordingly, resolving ARP requests across EPGs may be challenging. Embodiments of the disclosure may address this conflicting requirement by supporting a proxy-ARP across a distributed Clos network when FIE functionality is enabled.

In addition, some users may also want to have EPGs comprising appliance service nodes like load balancers (LBs) or firewalls (FWs). However, the SDN should not be doing FIE for this EPG if the BD is configured for FIE. This may create a problem because, otherwise, the LB/FW may not be able to see the packets of other EPGs in the same BD.

In conventional systems, FIE may be supported at a BD level, but this may create multiple problems. First, it does not support FIE of protocols. For example, ARP may be flooded in the BD across all the VLANs, leading to MAC flaps on southbound devices. Furthermore, conventional systems do not support FIE for unknown unicast, Layer 3 multicast, and IPV6 traffic for example. Also, conventional systems provide no provision to enable FIE for only one or some EPGs within a BD. Due to this, service integration may not be possible because FIE may not be enabled for EPGs comprising LB/FW service nodes for example. Moreover, with conventional systems, there may be no way to allow communication between EPGs without MAC flaps on south bound devices when FIE is enabled on the BD. Consequently, embodiments of the disclosure may support FIE for all protocols and BUM data traffic. In addition, embodiments of the disclosure may implicitly support proxy-ARP in these scenarios to support inter-EPG communication.

Figure 2:
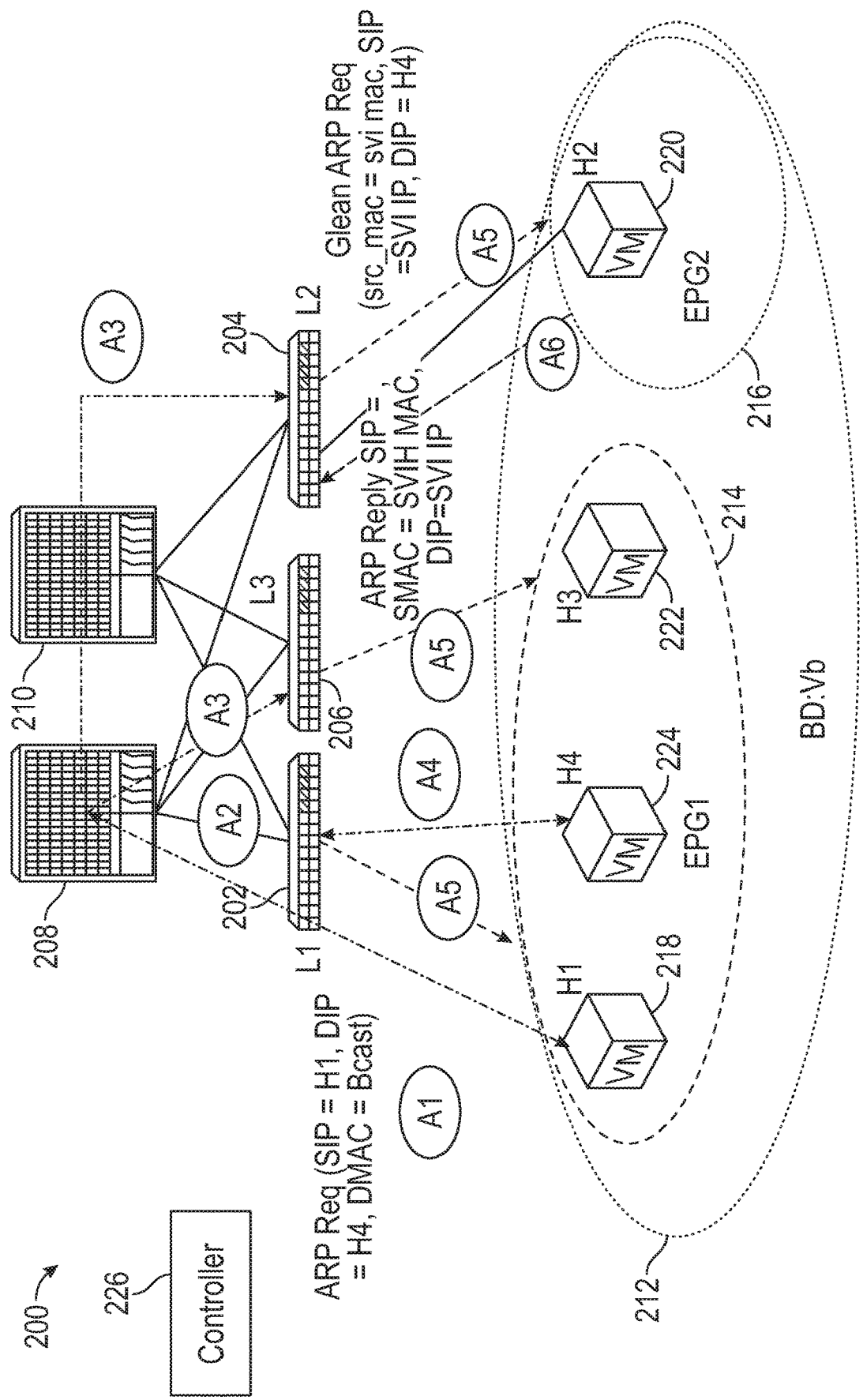
FIG. 2 is a block diagram of a networking system.

FIG. 2 is a block diagram of a networking system 200. Networking system 200 may comprise an Application Centric Infrastructure (ACI) fabric that my apply SDN. As shown in FIG. 2, system 200 may comprise a first leaf switch 202, a second leaf switch 204, a third leaf switch 206, a first spine switch 208, and a second spine switch 210. System 200 may support a BD 212 that may include a first EPG 214 and a second EPG 216. BD 212 may include any number of EPGs and is not limited to two. A plurality of hosts may be included in BD 212. The plurality of hosts may comprise a first host 218, a second host 220, a third host 222, and a fourth host 224. The plurality of hosts may include any number of hosts and is not limited to four. First EPG 214 may comprise first host 218, third host 222, and fourth host 224. Second EPG 216 may comprise second host 220. The plurality of hosts may comprise, but are not limited to, Virtual Machines (VMs) that may comprise software modules running on a service cluster in a data center.

As shown in FIG. 2, first host 218 and fourth host 224 may be connected to respective southbound ports of first leaf switch 202, second host 220 may be connected to south bound ports of second leaf switch 204, and third host 222 may be connected to a south bound port of third leaf switch 206. First spine switch 208 may be connected to first leaf switch 202, second leaf switch 204, and third leaf switch 206. Similarly, second spine switch 210 may be connected to first leaf switch 202, second leaf switch 204, and third leaf switch 206.

System 200 may also comprise a controller 226 that may: i) provide centralized access to all ACI fabric information; ii) optimize the application lifecycle for scale and performance; and iii) support flexible application provisioning across physical and virtual resources. Controller 226 may provide other functionality and is not limited to the aforementioned.

The elements of system 200 may be practiced in electrical circuits comprising discrete electronic elements, packaged or integrated electronic chips containing logic gates, a circuit utilizing a microprocessor, or on a single chip containing electronic elements or microprocessors. Furthermore, elements of system 200 may also be practiced using other technologies capable of performing logical operations such as, for example, AND, OR, and NOT, including but not limited to, mechanical, optical, fluidic, and quantum technologies. As described in greater detail below with respect to FIG. 5, elements of system 200 may be practiced in a computing device 500.

An FIE option may be enabled by controller 226 and may be used to limit flooding traffic inside BD 212 to a single encapsulation. (FIE supported on the EPG level will be discussed in greater detail below with respect to FIG. 4.) With FIE, when two EPGs (e.g., first EPG 214 and second EPG 216) share the same BD (e.g., BD 212) and FIE is enabled, the EPG flooding traffic may not reach the other EPG. Consistent with embodiments of the disclosure, where FIE is enabled by a user on an EPG level or a BD level, proxy-ARP may be implicitly enabled in the switches of system 200 (e.g., first leaf switch 202, second leaf switch 204, third leaf switch 206, first spine switch 208, and second spine switch 210). This may ensure communication across EPGs without the MAC flap issues as described above. If Proxy-ARP is enabled on the EPG level or BD level by controller 226, consistent with embodiments of the disclosure, then inter-EPG ARP requests may be dealt with by, for example, either a glean request or a proxy-ARP response depending on whether the target IP is known or unknown respectively.

FIG. 2 illustrates a series of states associated with an ARP request from first host 218 (in first EPG 214) to second host 220 (in second EPG 216). In this example, second host 220 is not known in the ACI fabric and both first EPG 214 and second EPG 216 have FIE enabled. As shown in FIG. 2, first host 218 may send an ARP request to second host 220 (state A1). For example, the ARP request may comprise: ARP Req (SIP=H1, DIP=H4, DMAC=Bcast). Because first host 218 may be connected to first leaf switch 202, first leaf switch 202 may receive the ARP request. Second host 220 is not known at first leaf switch 202.

The ARP request packet may then be flooded locally from first leaf switch 202 in first EPG 214 and to first spine switch 208 with first EPG 214's virtual network identifier (VNID) (state A2). Next, first spine switch 208 may flood these packets to all leafs (i.e., first leaf switch 202, second leaf switch 204, and third leaf switch 206) where BD 212 is present (state A3). The originally flooded ARP request may be sent out of leafs only in first EPG 214 (the one that comes with EPG VNID) (state A4).

Because second host 220 belongs to second EPG 216, which is different from the incoming first EPG 214, first leaf switch 202, second leaf switch 204, and third leaf switch 206 may send a Glean ARP request to second host 220 with Source as SVI IP and SVI MAC (state A5). A copy of the flooded packet may be provided to the leaf switches' central processing units (CPUs) to generate Glean ARP requests. For example, the Glean ARP request may comprise: Glean ARP req (src_mac=svi mac, SIP=SVI IP, DIP=H4). In response, second host 220 may send an ARP Reply to SVI MAC (state A6). For example, the ARP Reply may comprise: ARP reply SIP=H4, SMAC=SVI MAC, DIP=SVI IP. As a result, second leaf switch 204 now knows second host 220. At this point, first host 218 still does not get MAC resolution for second host 220, so first host 218 may keep sending ARP requests for second host 220.

Figure 3:
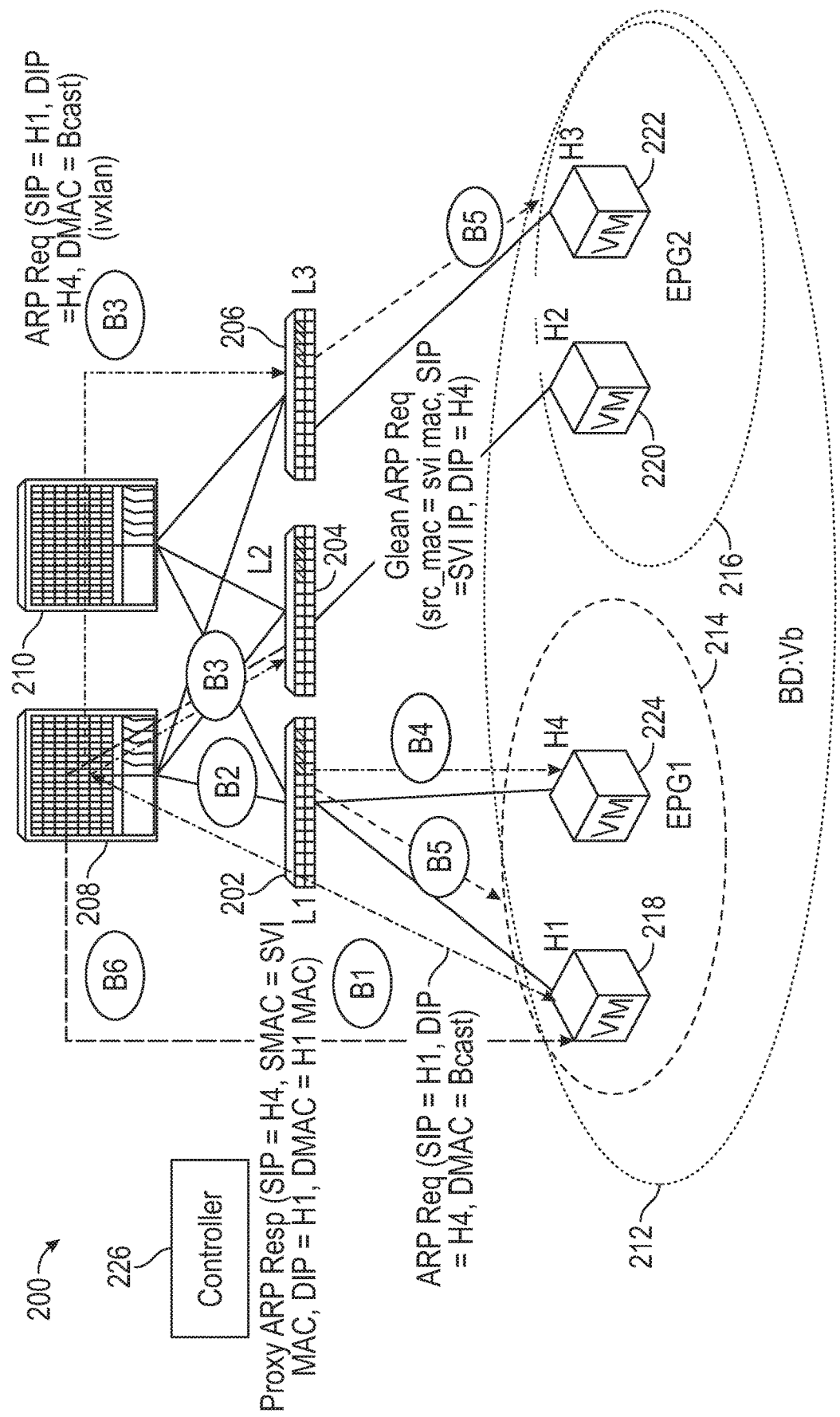
FIG. 3 is a block diagram of a networking system.

FIG. 3 illustrates a series of states associated with an ARP request from first host 218 (in first EPG 214) to second host 220 (in second EPG 216). Unlike the example of FIG. 2, in the example of FIG. 3, second host 220 may be known in the ACI fabric. For example, second host 220 may have become known in the ACI fabric by the process described in FIG. 2 (i.e., second host 220 may be known (i.e., learnt) on second leaf switch 204). Both first EPG 214 and second EPG 216 have FIE enabled. In this example, first EPG 214 may comprise first host 218 and fourth host 224. Second EPG 216 may comprise second host 220 and third host 222.

As shown in FIG. 3, first host 218 may send an ARP request to second host 220 (state B1). For example, the ARP request may comprise: ARP Req (SIP=H1, DIP=H4, DMAC=Bcast). Because first host 218 may be connected to first leaf switch 202, first leaf switch 202 may receive the ARP request. Second host 220 is not yet known at first leaf switch 202.

The ARP request packet may then be flooded locally from first leaf switch 202 in first EPG 214 and to first spine switch 208 with first EPG 214's virtual network identifier (VNID) (state B2). Next, first spine switch 208 may flood these packets to all leafs (i.e., first leaf switch 202, second leaf switch 204, and third leaf switch 206) where BD 212 is present (state B3). The originally flooded ARP request may be sent out of leafs only in first EPG 214 (the one that comes with EPG VNID) (state B4).

Next, first leaf switch 202 and third leaf switch 206 may send Glean ARP request to second host 220 with Source as SVI IP and SVI MAC (state B5). A copy of the flooded packet may be provided to the leaf switches' central processing units (CPUs) to generate Glean ARP requests. For example, the Glean ARP request may comprise: Glean ARP req (src_mac=svi mac, SIP=SVI IP, DIP=H4). However, because second leaf switch 204 has already learnt second host 220 locally, instead of creating a Glean ARP request, second leaf switch 204 may send a Proxy-ARP Reply for second host 220 to first host 218 with SVI MAC (state B6). Now for second host 220, first host 218 has mac=SVI MAC. Similarly, second host 220 may resolve first host 218 with SVI MAC and first host 218 and second host 220 may communicate via the ACI fabric as a router for example.

One issue may comprise the source EPG of the origination host not being deployed on any of the remote leaves. For example, if first host 220 is not deployed in second leaf switch 204 or third leaf switch 206, then the packet may be dropped. In this case, the ACI fabric may not be able to do proxy-ARP functionality. To avoid this issue, consistent with embodiments of the disclosure, the originating packet may also be sent to the CPU on the local Top-of-Rack (TOR) switch so that the same packet may be injected again to remote TORs with BD VNID—"with ingress EPG VLAN information embedded within target hardware address" for example. In other words, the target hardware address may be hijacked to carry the incoming EPG's context. Because these packets may be sent with the BD VNID, the above issue does not happen. Packets may not be dropped even if first EPG 214 is not deployed on remote TORs, and hence proxy-ARP functionality will work. Special care may be taken to not forward the injected packet out of the front panel ports on remote TORs (this may be done via ACLs in ACI). Also, proxy-ARP may not be performed on both the EPG VNID and BD VNID packets if the source EPG is already deployed on remote TORs.

By implicitly enabling proxy-ARP, there may be no confusing configuration exposed to a user to enable intra and inter EPG communication. Instead the complexity of FIE and proxy-ARP states may be maintained within the ACI fabric. Embodiments of the disclosure may also work in distributed networks like ACI by re-injecting the packet with BD-VNID, but ensuring it does not get forwarded locally on downlink ports of the ACI. With embodiment of the disclosure, users may be able to make application centric deployments without the need to change IP of endpoints. The ACI may be able to integrate with users who have devices that do VLAN agnostic MAC learning. Embodiments of the disclosure may be extended to any SDN data center distributed system that has similar integration issues.

Figure 4:
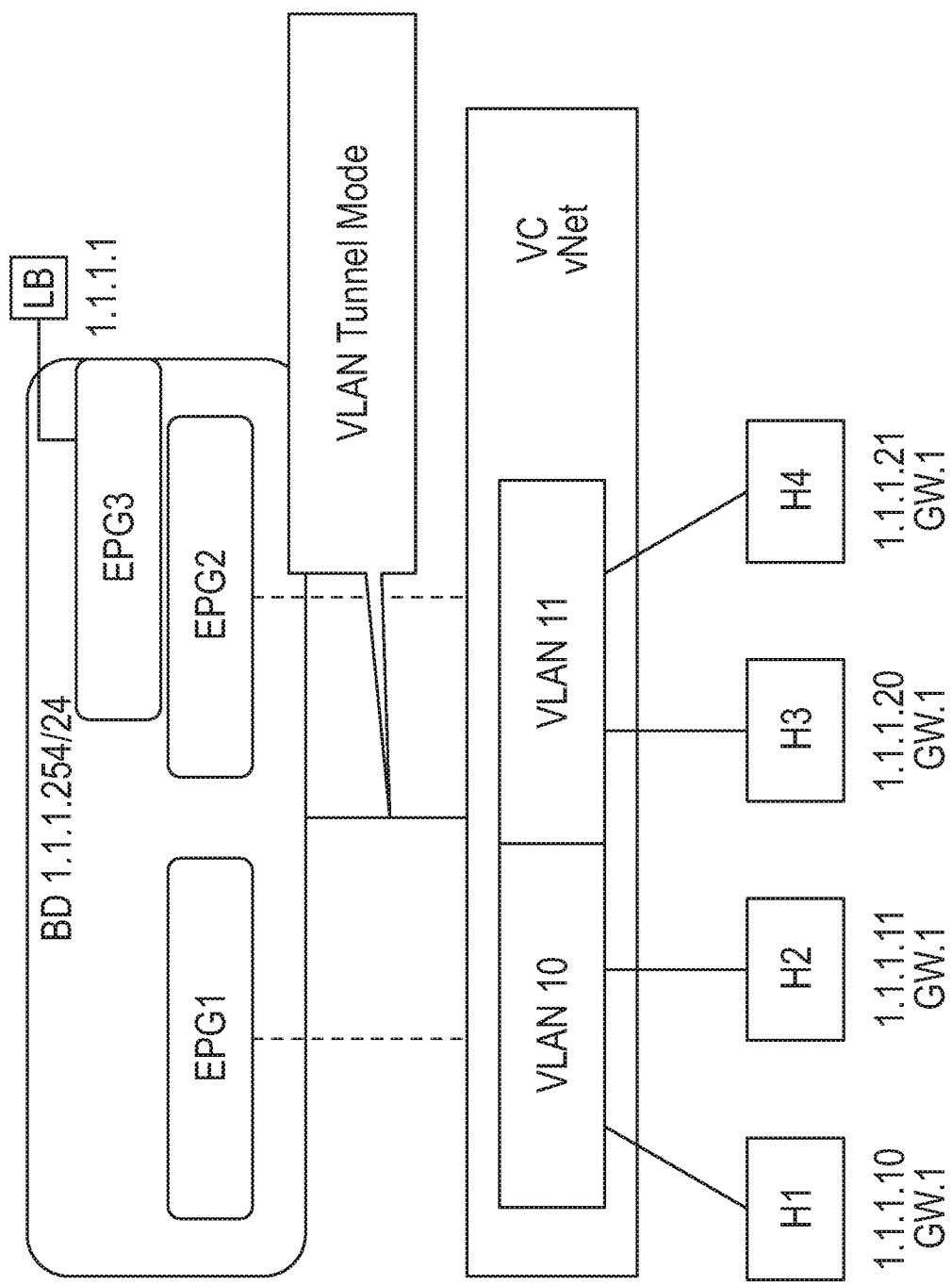
FIG. 4 illustrates flexible support for Flood in Encapsulation (FIE) at the End Point Group (EPG) level or Bridge Domain (BD) level.

FIG. 4 illustrates flexible support for flood in encapsulation at the EPG or BD level. ARP requests from hosts may be flooded within incoming EPG encapsulation. However, in some situations, an ARP request may need to be sent as is from a host to a service node (e.g., a firewall (FW) or a load balancer (LB) comprising different EPGs) if a service node is acting as a gateway (GW). To solve this contradicting requirement, ARP requests may be punted to a CPU where it can be checked to see if the target IP is part of a service (e.g. LB/FW) EPG. If so, then the packet may be sent from the CPU to the service node with the original host MAC in the ARP request. This way, packets may be sent to service nodes as is.

Consequently, when a service node (e.g., in a service node EPG) is responding, embodiments of the disclosure may ensure proxy-ARP and FIE are not enabled on that service EPG so packets get Layer 2 forwarded from the service EPG to the host EPG. Accordingly, the forwarding symmetric (i.e., the Layer 2 forwarding) may be done in both incoming and outgoing traffic between hosts and service nodes. As a result, embodiments of the disclosure may support (FIE) on host EPGs, but may disable FIE on service EPGs. In other words, embodiments of the disclosure may support FIE on both the BD level as well as the EPG level. If users want to enable FIE for all EPGs in a BD, then FIE may be enable at the BD level. However, if users want not to enable FIE for some EPGs in a BD, then FIE may be enable at the EPG level on those EPGs on which FIE is desired and not enable FIE on those EPGs on which FIE is not desired. As shown in FIG. 4, if FIE is desired on EPG1, EPG2, and EPG3, FIE may be enabled for the BD. However, if EPG3 comprises an EPG for service nodes (e.g., load balancers), FIE may be disables on the BD level, enabled for EPG1 and EPG2, and disabled for EPG3.

Consequently, embodiments of the disclosure may provide the flexibility to configure FIE for all EPGs of a BD (if the feature is enabled at BD) or to selectively enable the feature on only few of the EPGs of the BD (e.g., if needed for service integration). This may also allow support for service integration by allowing integration of FIE to work within host EPGs, but allow inter-EPG flood between only service EPGs and host EPGs.

Embodiments of the disclosure may also identify BUM traffic including protocols. Whenever FIE is performed, BUM traffic may be identified in hardware accurately and FIE action may be initiated within Ternary Content-Addressable Memory (TCAM) results in a switches. Embodiments of the disclosure may classify the traffic patterns into: i) Layer 2 multicast, unknown unicast, and broadcast; ii) Layer 3 multicast and broadcast; and iii) link local protocols (e.g. OSPF, IGMP, DHCP, PIM, EIGRP, CDP, STP, LACP, LLDP, ISIS, BGP, ARP/GARP, ND, etc.). Embodiments of the disclosure may accomplish this in hardware without impacting existing features on protocol entries. For this, classification entries may be walked and merged to identify only those traffics entering on a specific BD/EPG to derive FIE action. A selective merge may ensure that existing features on default entries may not be disturbed.

Figure 5:
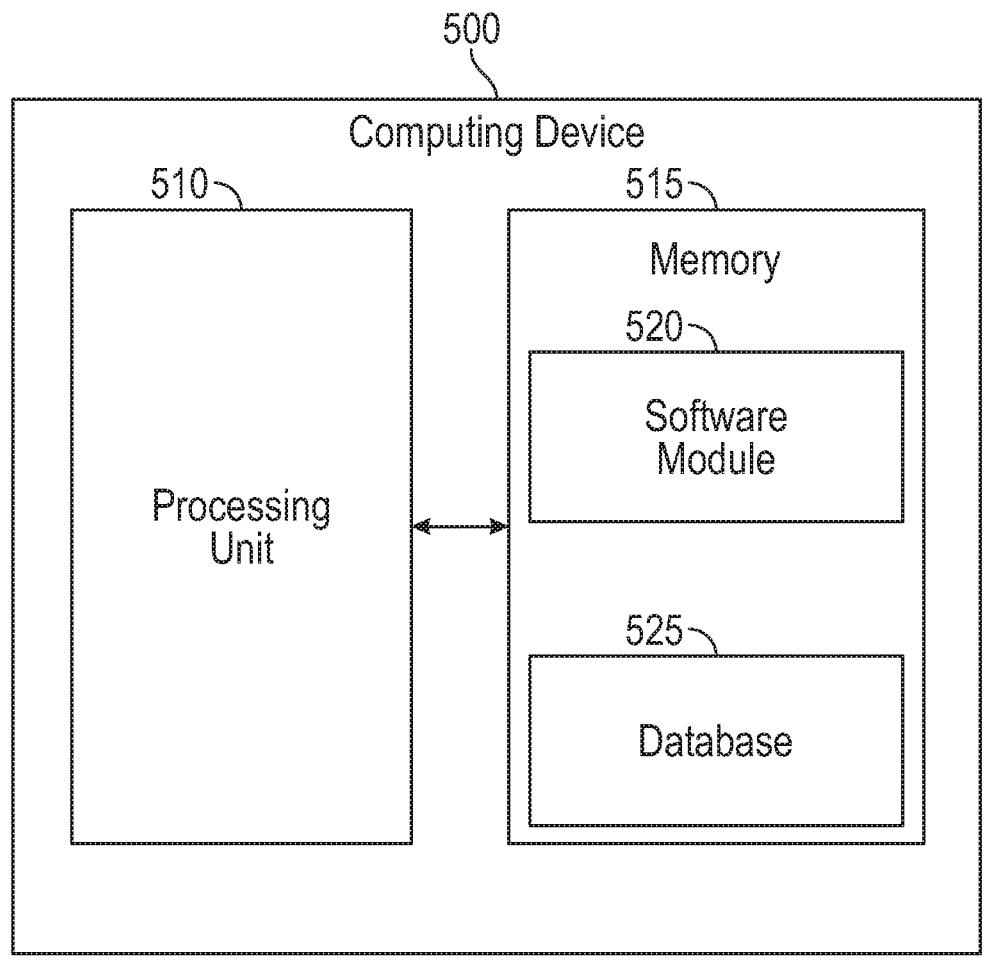
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for providing support for flooding in encapsulation and inter-VLAN communication via proxy-ARP, including for example, any one or more of the states described above with respect to FIG. 2 and FIG. 3. Computing device 500, for example, may provide an operating environment for any of the elements shown in FIG. 2 and FIG. 3. The elements shown in FIG. 2 and FIG. 3 may operate in other environments and are not limited to computing device 500.

Computing device 500 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 2 and FIG. 3 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    receiving, at a first leaf switch from a first host, a request for a second host having an IP address that is not known at the first leaf switch, the first host being within a first End Point Group (EPG) and the second host being within a second EPG, wherein the first EPG and the second EPG are in a Bridge Domain (BD), wherein flood in encapsulation is enabled for intra-Virtual Local Area Network (VLAN) traffic for the first EPG, and wherein flood in encapsulation is enabled for the intra-VLAN traffic for the second EPG;

flooding, by the first leaf switch, the request locally in the first EPG and to a spine switch with a Virtual Extensible Local Area Network (VXLAN) Network Identifier (VNID) of the first EPG;

flooding, by the spine switch, the request to a second leaf switch where the BD is present;

sending, by the second leaf switch, a glean request for the second host, wherein sending the glean request for the second host comprises:

copying the flooded request received from the spine switch to a central processing unit (CPU) of the second leaf switch, generating the glean request by the CPU, and sending, by the second leaf switch, the glean requested generated by the CPU;

receiving, by the second leaf switch in response to sending the glean request, a reply; and learning the second host locally at the second leaf switch in response to receiving the reply.

2. The method of claim 1, further comprising:

identifying broadcast, unknown unicast, and multicast (BUM) traffic including protocols in hardware in the first leaf switch; and initiate flooding in encapsulation action within ternary content-addressable memory (TCAM) result.

3. The method of claim 1, wherein the BD comprise a third EPG wherein flood in encapsulation is not enabled for the third EPG.

4. The method of claim 3, wherein the third EPG comprising service nodes.

5. The method of claim 4, wherein the service nodes comprise load balancers.

6. The method of claim 4, wherein the service nodes comprise firewalls.

7. The method of claim 1, wherein the request comprises an Address Resolution Protocol (ARP) request.

8. The method of claim 1, wherein the glean request comprises an Address Resolution Protocol (ARP) glean request.

9. The method of claim 1, wherein the reply comprises an Address Resolution Protocol (ARP) reply.

10. A method comprising:

receiving, at a first leaf switch from a first host, a request for a second host having an IP address that is not known at the first leaf switch, the first host being within a first End Point Group (EPG) and the second host being within a second EPG, wherein the first EPG and the second EPG are in a Bridge Domain (BD), wherein flood in encapsulation is enabled for intra-Virtual Local Area Network (VLAN) traffic for the BD;

flooding, by the first leaf switch, the request locally in the first EPG and to a spine switch with a Virtual Extensible Local Area Network (VXLAN) Network Identifier (VNID) of the first EPG;

flooding, by the spine switch, the request to a second leaf switch where the BD is present and to a third leaf switch where the BD is present;

sending, by the second leaf switch, a glean request, wherein sending the glean request by the second leaf switch comprises:

copying the flooded request received from the spine switch to a central processing unit (CPU) of the second leaf switch, generating the glean request by the CPU, and sending, by the second leaf switch, the glean requested generated by the CPU; and sending, by the second leaf switch in response to determining that the second host is known on the second leaf switch, a reply to the first host.

11. The method of claim 10, further comprising:

identifying broadcast, unknown unicast, and multicast (BUM) traffic including protocols in hardware in the first leaf switch; and initiate flooding in encapsulation action within ternary content-addressable memory (TCAM) result.

12. The method of claim 10, wherein the request comprises an Address Resolution Protocol (ARP) request.

13. The method of claim 10, wherein the glean request comprises an Address Resolution Protocol (ARP) glean request.

14. The method of claim 10, wherein the reply comprises an Address Resolution Protocol (ARP) reply.

15. A system comprising:

a first leaf switch configured to:

receive, from a first host, a request for a second host having an IP address that is not known at the first leaf switch, the first host being within a first End Point Group (EPG) and the second host being within a second EPG, wherein the first EPG and the second EPG are in a Bridge Domain (BD), wherein flood in encapsulation is enabled for intra-Virtual Local Area Network (VLAN) traffic for the first EPG and flood in encapsulation is enabled for the intra-VLAN traffic for the second EPG, and flood the request locally in the first EPG and to a spine switch with a Virtual Extensible Local Area Network (VXLAN) Network Identifier (VNID) of the first EPG;

the spine switch configured to flood the request to a second leaf switch where the BD is present; and the second leaf switch configured to:

send a glean request for the second host, wherein the second leaf switch being configured to send the glean request for the second host comprises the second leaf switch being configured to:

copy the flooded request received from the spine switch to a central processing unit (CPU) of the second leaf switch, generate the glean request by the CPU, and send the glean requested generated by the CPU, receive, in response to sending the glean request, a reply, and learn the second host locally at the second leaf switch in response to receiving the reply.

16. The system of claim 15, wherein the request comprises an Address Resolution Protocol (ARP) request.

17. The system of claim 15, wherein the glean request comprises an Address Resolution Protocol (ARP) glean request.

18. The system of claim 15, wherein the reply comprises an Address Resolution Protocol (ARP) reply.

19. The system of claim 15, wherein the BD comprise a third EPG, and wherein flood in encapsulation is not enabled for the third EPG.

20. The system of claim 19, wherein the third EPG comprising service nodes.

* * * * *